United States Patent [19]

Butoi

[11] 4,381,041
[45] Apr. 26, 1983

[54] ELECTRIC POWER GENERATING SYSTEM

[76] Inventor: Aristotel Butoi, 689 Seneca Ave., Ridgewood, N.Y. 11385

[21] Appl. No.: 208,699

[22] Filed: Dec. 31, 1980

[51] Int. Cl.³ .............................................. B60L 11/18
[52] U.S. Cl. ................................... 180/65 D; 60/414; 91/275; 92/73; 92/136; 320/61; 417/231; 417/233
[58] Field of Search .................... 180/65 D, 165, 305, 180/306, 65 B, 65 C; 320/61, 62; 290/1 R, 1 A, 1 C, 50; 60/413, 414, 418; 92/68, 73, 136; 91/275, 55; 417/231, 233; 188/291

[56] References Cited

U.S. PATENT DOCUMENTS

| | | | |
|---|---|---|---|
| 692,393 | 2/1902 | Weimar | 92/136 X |
| 778,133 | 12/1904 | Keates | 180/65 D X |
| 1,677,481 | 7/1928 | Lareva | 188/291 |
| 3,365,624 | 1/1968 | Komendera | 91/275 X |
| 4,024,926 | 5/1977 | Butoi | 180/65 D |
| 4,183,420 | 1/1980 | Kinoshita | 60/414 X |

FOREIGN PATENT DOCUMENTS 1252634 12/1960 France .................................. 92/136

*Primary Examiner*—David M. Mitchell
*Assistant Examiner*—Milton L. Smith
*Attorney, Agent, or Firm*—Jordan and Hamburg

[57] ABSTRACT

An electric power generating system adapted for use in a vehicle including at least one electric generator and one battery; and at least one energy converter for receiving superfluous movement of the vehicle and producing pressure fluid flow from such movement, and a power transmitting means for receiving and changing the fluid flow into rotational power. The power transmitting means transmits rotational power to the electric generator only when stored rotational power reaches a predetermined level. Therefore, the generator is operated by superfluous movement of the vehicle to generate electricity.

14 Claims, 6 Drawing Figures

FIG. I

ELECTRIC POWER GENERATING SYSTEM

BACKGROUND OF THE INVENTION AND PRIOR ART STATEMENT

The invention relates to an electric power generating system for a vehicle. More particularly, the invention relates to an electric generating system for an electric vehicle for charging electricity to batteries by utilizing wasted power in driving the vehicle.

In a gasoline engine car, an electric generator is connected to an engine and is always operated for charging necessary electricity into batteries as long as the engine turns over. In an electric motor car, however, the electric generator cannot feasibly be connected to an electric motor for moving the car due to energy consumption-reproduction rates between the electric motor and the electric generator. It is preferable to find another energy source for generating electricity in an electric car and for charging the batteries to prolong battery life in each usage. Many techniques have been proposed in this regard.

In U.S. patent application Ser. No. 139,049 filed on Apr. 10, 1980, now abandoned, an electric power generating system is disclosed utilizing inertial rotation of a drive shaft and vertical movement of vehicle suspensions. The system mechanically transfers or changes superfluous movement into rotational power and thereby charges the electrical generator. The system effectively operates to thereby generate electricity.

In U.S. Pat. No. 3,861,487, an electric power means for a vehicle is shown in which an electric generator is operated by vertical reciprocating movement of the vehicle's wheel axles. Namely, two cylinders having pistons therein are situated between each axle of the wheel and a body of the vehicle so that the pistons receive vertical movement of the wheels and transmit fluid to a pump through a pressure tank to thereby rotate the generator. Rotation of the pump winds a spring. When rotational power is stored to a certain level in the spring, the generator is rotated by the power reserved in the spring. The power means utilizes the pump to wind the spring. Since it relatively requires a great deal of power to rotate the pump, fluid from the cylinders is stored in the pressure tank until enough pressure is obtained therein, and then the pump is rotated. Accordingly, the generator is rotated only periodically, and it is therefore impossible to obtain enough electricity for a vehicle. Energy efficiency of the power means is not good.

A shock absorber drive unit is disclosed in U.S. Pat. No. 3,981,204, in which vertical movement of the shock absorber is mechanically changed into rotating power for the generator. U.S. Pat. Nos. 3,559,027; 3,939,935; 4,032,829; and 4,113,047 all disclose related structures and techniques as stated above. In these patents, vertical movement of suspensions of the vehicle is directly changed into rotating power for the generator. These techniques will be satisfactory so long as each mechanism is utilized independently. Namely, the techniques in these patents cannot be combined with other power for operating the generator because magnitudes of superfluous power that is produced are different and power cannot be easily accumulated for rotating one generator.

Accordingly, an object of the invention is to provide an electric power generating system utilizing superfluous power.

Another object of the invention is to provide an electric power generating system as stated above, in which superfluous power is efficiently accumulated to rotate one generator.

A further object of the invention is to provide an electric power generating system as stated above, in which the generating system operates by an inertial force when the vehicle moves as well as by vertical movement of vehicular suspensions.

Still further objects and advantages of the invention will be apparent from the following description of the invention.

SUMMARY OF THE INVENTION

In accordance with the invention, an electric power generating system adapted for use in a vehicle is provided. The vehicle includes at least one electric generator and one battery. The generator comprises at least one energy converter for receiving waste movement of the vehicle and producing pressure fluid flow therefrom, and power transmitting means for receiving and changing the fluid flow into rotational power and transmitting the rotational power to the electric generator when the stored rotational power reaches a predetermined level. The generator is, therefore, operated by superfluous movement of the vehicle and generates electricity.

The power transmitting means of the electric power generating system comprises at least one power cylinder having a power piston therein with a power piston rod extending outwardly from the power cylinder, which is actuated by the pressure fluid flow transferred from the energy converter. The power transmitting means further includes coupling means engaged with the power piston rod of the power cylinder for changing reciprocal movement of the power piston into rotational movement, and a speed converter disposed between the coupling means and the electric generator. Preferably, the power transmitting means includes two power cylinders, each having a power piston and a power piston rod. A two-way valve is provided for selectively transmitting the pressure fluid flow from the energy converter into one of said two power cylinders to alternately operate the power cylinders for continuously rotating the speed converter.

Each power cylinder comprises a piston spring inside the power cylinder to urge the power piston into a retracted position, an outlet valve connected to the cylinder, and a switch for actuating the two-way valve and the outlet valve. When one of the power pistons is extended to a maximum position, the switch is actuated to change the two-way valve to allow the pressure fluid flow to enter into the other cylinder and close the outlet valve of the other cylinder. At the same time, the switch operates to open the outlet valve of the extended power cylinder to allow the fluid to exit therethrough by pressure of the power piston due to the piston spring. The above operation is repeated for every actuation of the switches installed in the power cylinders.

The power transmitting means further comprises a pressure regulator to feed the constant flow of fluid from the energy converter to the cylinders, and a fluid reservoir to receive fluid from the power cylinders and supply fluid to the energy converter. When high pressure fluid is transferred to the pressure regulator, the regulator receives the high pressure fluid and feeds lower pressure fluid to the cylinders. At the same time, the regulator retains or accumulates high pressure fluid therein. When fluid pressure supplied from the energy converter drops, the high pressure fluid accumulated in the pressure regulator is gradually supplied to the cylinders. In the case where high pressure fluid is continuously supplied to the regulator, fluid is transferred to the fluid reservoir directly through the pressure regulator.

The coupling means of the power transmitting means comprises a shaft, two single-direction gears connected to the shaft to rotate the shaft in one direction, and a coupling spring situated between the shaft and an end of the speed converter. The gears are engaged with the power piston rods of the power cylinders to transfer only expansion movement of each power piston rod to the shaft. Consequently, when the power cylinders expand alternately, the shaft is continuously rotated. Rotational power applied to the shaft is retained in the coupling spring, and when the rotational power reaches a predetermined level, the speed converter rotates to charge the electric generator.

The energy converter of the electric power generating system comprises at least one first energy converter including at least one fluid pump with a handle. The handle is connected to a wheel shaft of the vehicle to receive vertical movement of the wheel shaft when the vehicle is driven so that the fluid pump is operated to transfer fluid to the power transmitting means. Preferably, the first energy converter is provided with two fluid pumps. The fluid pumps are actuated so that when the wheel shaft moves upwardly and downwardly, one of the pumps is in a inspiration cycle and the other pump is in an expiration cycle to continuously transmit fluid to the power transmitting means.

The fluid pump of the energy converter comprises a pump cylinder and a pump piston in the cylinder. The pump piston is engaged with the handle to be moved up and down due to vertical movement of the wheel shaft. The fluid pump is further provided with two one-way valves for inspiration and expiration of fluid into and out of the cylinder. Consequently, when the pump piston is moved vertically, the fluid is transferred to the power transmitting means. Preferably, a plurality of first energy converters are provided in the vehicle, for example at front and/or rear suspensions of the vehicle.

The energy converter of the electric power generating system may additionally comprise a second energy converter adapted to receive rotational power of a drive shaft due to inertial movement of the vehicle. The second energy converter may be used together with the first energy converter. In this case, it is unnecessary to provide another power transmitting means. The power transmitting means is operated by the fluid transferred from both the first and second energy converters.

The second energy converter comprises clutch means having a drive disk fixed to the drive shaft and a rotational member slidably situated along a longitudinal direction of the drive shaft, operation means for sliding the rotational member toward the drive disk, and pumping means connected to the rotational member for flowing the fluid to the power transmitting means. When the operation means is actuated, the rotational member is moved to frictionally engage the drive disk. Consequently, the rotational member is rotated around the drive shaft to actuate the pumping means. The operation means is only actuated when the drive shaft is not driven by the power means of the vehicle so that the rotational member of the clutch means is driven by rotation of the drive shaft due to inertial movement of the vehicle.

The rotational member of the clutch means includes a front frictional portion to frictionally connect to the drive disk, and a clutch pinion engaged with the pumping means. Immovable intermediate gear means is preferably disposed between the pumping means and the clutch pinion of the clutch means. The clutch pinion is always engaged with the intermediate gear means even if the rotational member is moved back and forth. Accordingly, when the rotational member is engaged with the drive disk, the pumping means is operated.

The operation means comprises an operation piston connected to the rotational member, an operation pump for moving the operation piston back and forth, and a switch for actuating the operation pump. The switch is associated with an accelerator of the vehicle so that when the accelerator is off, the switch operates to activate the operation pump to thereby frictionally connect the rotational member with the drive disk.

When the pumping means operates, the fluid is supplied from the fluid reservoir to the pumping means. The fluid from the pumping means is transferred to the power cylinders through the pressure regulator and is then returned to the fluid reservoir.

DETAILED DESCRIPTION OF A PREFERRED EMBODIMENT

Figure 1:
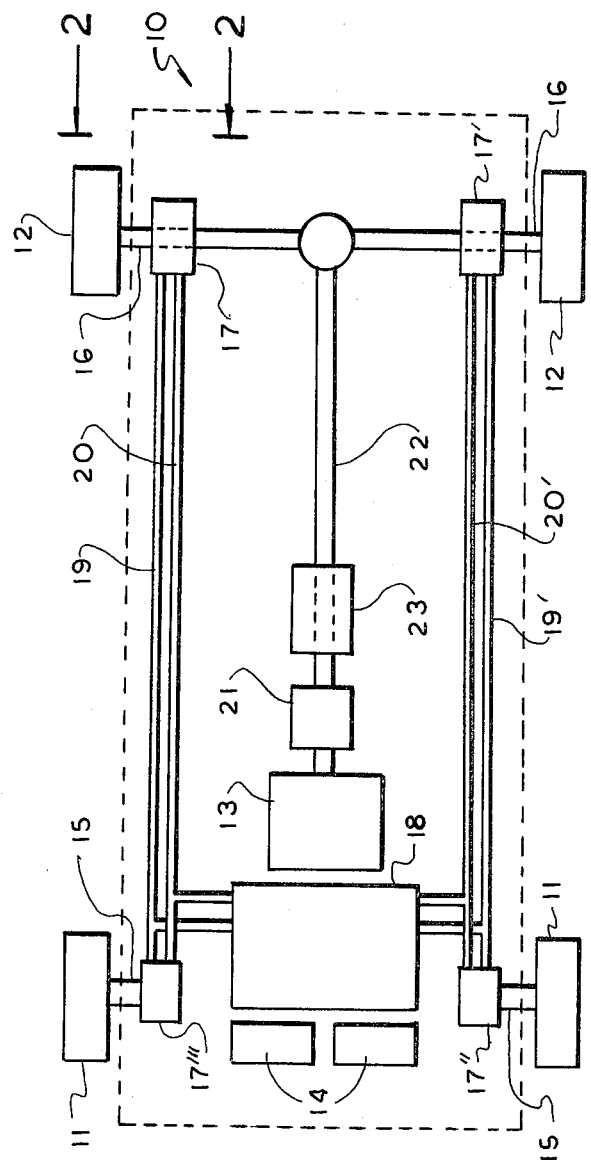
FIG. 1 is a top plan view of the vehicle equipped with an electric power generating system according to the present invention.

Referring to the drawings, FIG. 1 shows a top plan view of an electric motor car 10 equipped with an electric power generating system in accordance with the present invention. The car 10 is provided with front wheels 11, rear wheels 12 and an electric motor 13 actuated by batteries 14. The front wheels 11 are supported by axles 15 while the rear wheels 12 are attached to axles 16. First energy converters 17, 17', 17", 17'" are connected to the axles 15, 16 to receive vertical movement of the wheels 11, 12. The first energy converters 17, 17', 17", 17'" are further connected to a power transmitting unit 18 by means of fluid intake lines 19, 19 and fluid supply lines 20, 20.

The motor 13 is provided with an automatic transmission 21, and a drive shaft 22 extending rearwardly therefrom to connect the transmission 21 and the rear axles 16. In the middle portion of the drive shaft 22, a second energy converter 23 is installed, which is also connected to the power transmitting unit 18 by means of the fluid intake line and fluid supply line (both not shown).

Figure 2:
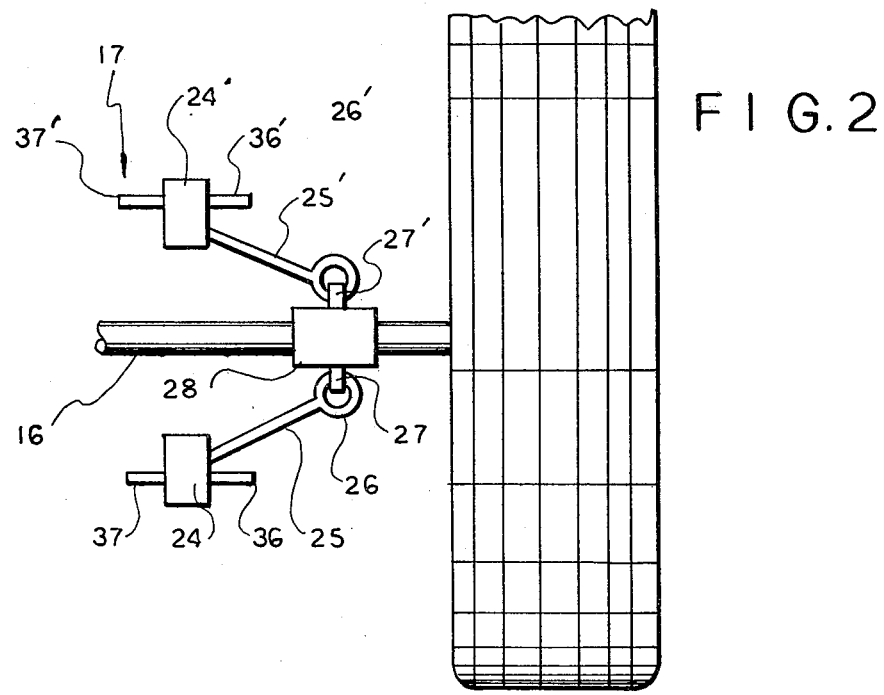
FIG. 2 is a rear side elevation view of a first energy converter, which is taken on line 2—2 in FIG. 1.
Figure 3:
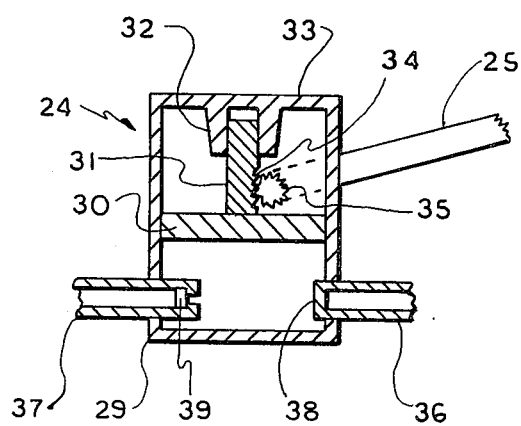
FIG. 3 is an enlarged cross section view of a fluid pump equipped with the first energy converter shown in FIG. 2.

In FIGS. 2 and 3, the first energy converter 17 is shown, which comprises two fluid pumps 24, 24' fixed to a body (not shown) of the car 10. The fluid pumps 24, 24' are vertically separated from each other, and each pump is respectively provided with a handle 25, 25' having a universal joint 26, 26' at a forward end thereof. The universal joints 26, 26' of the handles 25, 25' are connected to joints 27, 27' of a ring 28 situated around the axle 16 of the car 10. Accordingly, when the axle 16 moves up and down due to driving of the car 10, the handles 25, 25' move up and down as well. In FIG. 2, the first energy converter 17 is connected to the rear axle 16, but the energy converters 17", 17''', are also connected to the front axles 15 by the same manner as stated above (energy converter 17' is connected to the rear axle 16 too).

The fluid pump 24 comprises a cylinder 29 and a piston 30 with a piston rod 31. The piston rod 31 is reciprocatingly supported or inserted into a hollow base 32 of an end plate 33 of the cylinder 29, and is provided with teeth 34 on a side portion thereof. The teeth 34 of the piston rod 31 are engaged with a pinion 35 extending outwardly from the cylinder 29. The pinion 35 is connected to the handle 25 so that when the handle 25 is vertically moved, the pinion 35 rotates forwardly and backwardly. Consequently, the piston rod 31 is moved up and down to thereby reciprocally move the piston 30.

The fluid pump 24 includes an inlet pipe 36 and an outlet pipe 37. The inlet pipe 36 is provided with an inlet valve 38 and is connected to the fluid intake line 19, while the outlet pipe 37 is provided with an outlet valve 39 and is connected to the fluid supply line 20. Accordingly, when the piston 30 moves upwardly and downwardly, fluid is inspired into the cylinder 29 through the inlet pipe 36 and the valve 38 from the fluid intake line 19, and is expired to the fluid supply line 20 through the outlet pipe 37 and the outlet valve 39. As shown in FIG. 2, two fluid pumps 24, 24' are provided in one first energy converter 17, but they are operated such that either one of the pumps 24, 24' is always in an inspiration cycle and the other is in an expiration cycle. Consequently, fluid is continuously supplied to the fluid supply line 20.

Figure 5:
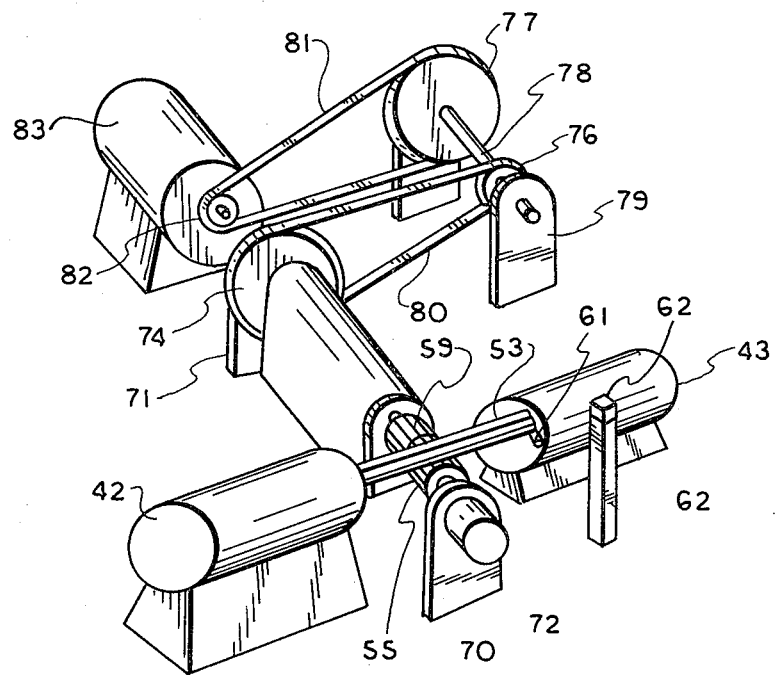
FIG. 5 is a perspective view of the power transmitting unit shown in FIG. 4, in which several members are deleted therefrom.
Figure 4:
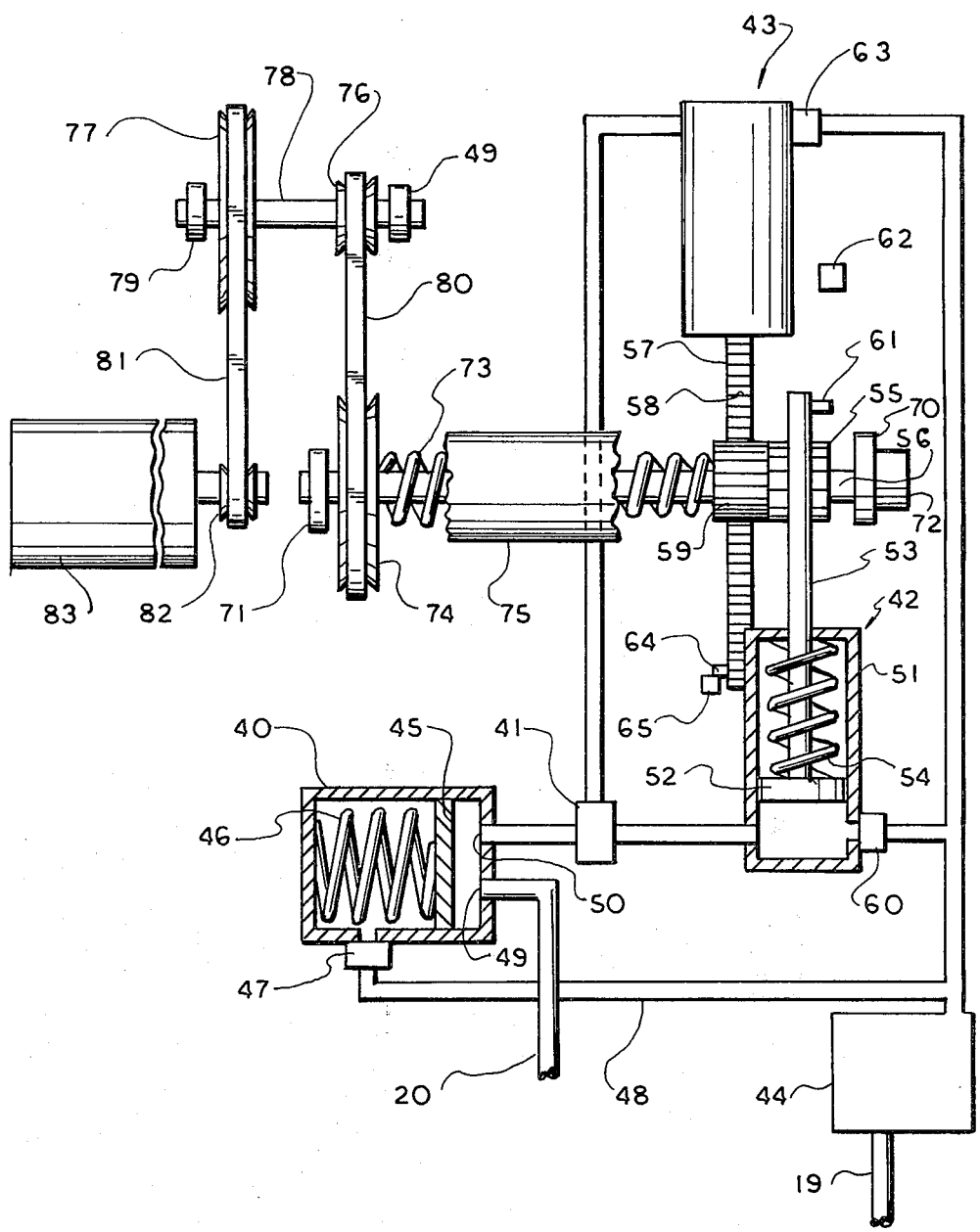
FIG. 4 is a plan view of a power transmitting unit, in which some members are shown in section and are schematically illustrated.

Referring to FIGS. 4 and 5, the power transmitting unit 18 is shown, which receives the fluid from the first energy converters 17, 17', 17", 17''' and the second energy converter 23 through the fluid supply line 20, and rotates a generator. The fluid from the energy converters 17', 17", 17''' and 23 is at first transmitted to a regulator 40 for regulating pressure of the fluid and is then sent through a two-way valve 41 to one of the power cylinders 42 or 43, where the fluid energy is changed into rotational power. The fluid is finally returned to a fluid reservoir 44.

The regulator 40 is provided with a piston 45, a spring 46, and a safety valve 47 connected to the fluid reservoir 44 through a pipe 48. Generally, the fluid flowing from the fluid supply line 20 enters into the regulator 40 through an inlet 49 and exits through an outlet 50 to the two-way valve 41. However, when high pressure fluid is transmitted through the fluid supply line 20, the piston 45 moves backwardly due to the high pressure. After the high pressure is reduced to normal pressure, the piston 45 gradually returns back to the initial position by means of the spring 46. When high pressure fluid is continuously supplied to the regulator 40 moving piston 45 rearwardly, the safety valve 47 is actuated for directly returning the high pressure fluid from the regulator 40 to the fluid reservoir 44 through the pipe 48. The regulator 40 receives high pressure fluid and retains the fluid therein, so that the regulator 40 also functions as a capacitor.

The power cylinders 42, 43, which are connected to the regulator 40 through the two-way valve 41, are both similar (therefore, only power cylinder 42 will be explained). The power cylinder 42 comprises a cylinder 51, a piston 52 with a piston rod 53 and a spring 54 around the piston rod 53. The piston rod 53 is provided with teeth (not shown) on an underside thereof to engage a single direction gear 55 connected to a shaft 56. A piston rod 57 of the power cylinder 43 is provided with teeth 58 to engage a single direction gear 59, on the shaft 56. The gears 55, 59 which are engaged with the piston rods 53, 57 respectively, are operated so that when the piston rods 53, 57 extend, the gears 55, 59 act to rotate the shaft 56. When the piston rods 53, 57 retract, the gears 55, 59 do not affect rotation of the shaft 56.

The power cylinder 42 is provided with an outlet valve 60, and the piston rod 53 includes a projection 61 at a forward end thereof to actuate a switch 62. On the other hand, the power cylinder 43 is provided with an outlet valve 63, and the piston rod 57 includes a projection 64 to actuate a switch 65. The switches 62, 65 operate to change the two-way valve 41 and the valves 60, 63.

When the valve 41 is opened for fluid communication between the regulator 40 and the power cylinder 42, the valve 60 is closed and the piston 52 is located in a retracted position. The fluid does not flow, in this condition, into the power cylinder 43 and the valve 63 thereof is open. When the energy converters 17, 17', 17", 17''', 23 operate, fluid is supplied to the power cylinder 42 through the fluid supply line 20, the regulator 40 and the valve 41. Consequently, the piston 52 is moved to an extended position against an expansion force of the spring 54 to thereby rotate the shaft 56. When the projection 61 actuates the switch 62, the two-way valve 41 is changed to direct the fluid from the regulator 40 to the power cylinder 43, and the valve 60 is opened, so that the piston 52 is moved back to the first position by the expansion force of the spring 54. The fluid in the power cylinder 42 is exhausted to the reservoir 44 through the valve 60. When the piston 52 returns to the first position, the teeth of the piston rod 53 are still engaged with the gear 55, but the gear 55 slips on the shaft 56 to avoid causing any rotation of the shaft 56.

The switch 62 also operates to close the valve 63. Therefore, fluid is then supplied to the power cylinder 43 through the two-way valve 41 to extend the piston of the power cylinder 43. Consequently, the piston rod 57 with the teeth 58 engaging the gear 59 is moved forwardly to rotate the shaft 56. When the projection 64 actuates the switch 65, the two-way valve 41 is again changed to direct the fluid to the power cylinder 42. At the same time, the valve 60 is closed and the valve 63 is opened. The piston in the power cylinder 43 is returned by a spring installed therein to the initial position to thereby exhaust fluid through the valve 63 to the reservoir 44. The fluid from the regulator 40 is again supplied to the power cylinder 42, and the shaft 56 is continuously rotated by the power cylinders 42, 43. The fluid exhausted by the power cylinders 42, 43 is stored in the reservoir 44, and is again supplied to the energy converters 17, 17', 17", 17''' through the fluid intake line 19, 19'.

The shaft 56 is supported by supporting plates 70, 71, and a single direction gear 72 is situated between the shaft 56 and the plate 70 to rotate the shaft 56 in one direction. Around the shaft 56, a spring 73 and a pulley 74 are disposed. One end of the spring 73 is connected to the shaft 56 and the other end of the spring 73 is connected to the pulley 74, so that when the shaft 56 is rotated by the power cylinders 42, 43, the spring 73 is at first wound and then the pulley 74 is rotated by rotational power of the spring 73. A cover 75 is provided around the spring 73 for its protection.

Pulleys 76, 77 are connected to a shaft 78 supported by supporting plates 79. A belt 80 is situated between the pulleys 74, 76, while a belt 81 is connected between the pulley 77 and a pulley 82 of the generator 83. The pulleys 74, 76, 77 and 82 constitute a speed converter for rotating the generator 83 at high speed.

As stated above, when the power cylinders 42, 43 are operated by the fluid, the shaft 56 is rotated in one direction and then the generator 83 is actuated to thereby generate electricity.

Figure 6:
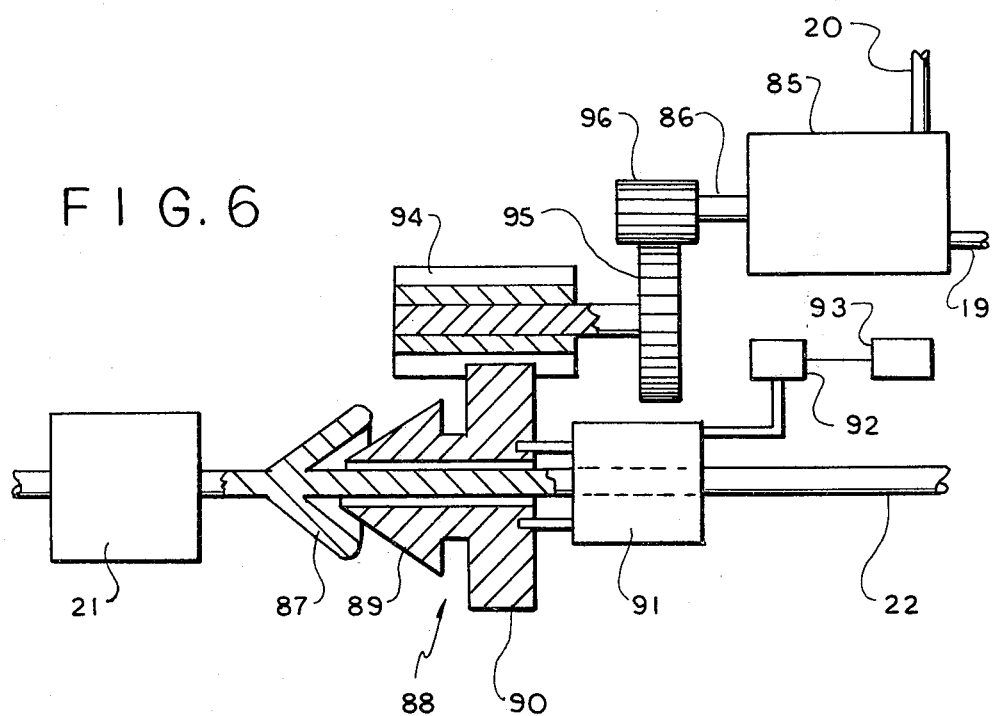
FIG. 6 is a side view of a second energy converter, in which some members are shown in section and are schematically illustrated.

Referring to FIG. 6, the second energy converter 23 is partially sectionally and schematically illustrated. The second energy converter 23 is provided with a pump 85 connected to the fluid reservoir 44 and the regulator 40 so that the pump 85 receives the fluid from the reservoir 44 through the fluid intake line 19 and transmits the fluid to the fluid regulator 40 through the fluid supply line 20. For rotating a shaft 86 of the pump 85, a drive disk 87 is integrally formed in the drive shaft 22 of the motor car 10. Adjacent the drive disk 87, a rotational member 88 is situated, through which the drive shaft 22 extends. The rotational member 88 includes a frictional portion 89 and a pinion 90, and can be moved in longitudinal direction of the drive shaft 22 by means of a piston 91. The piston 91 is connected to a pump 92 actuated by a switch 93 which cooperates with an accelerator (not shown) of the motor car 10.

The switch 93 is actuated such that when the accelerator is off, the switch 93 operates to actuate the pump 92 to move the piston 91 forwardly to thereby frictionally connect the frictional portion 89 with the drive disk 87. Consequently, when the motor car 10 is moving, the rotational member 88 is rotated together with the drive shaft 22. In the case where the accelerator is operated, the switch 93 turns off to actuate the pump 92 to move the piston 91 backwardly, so that the rotational member 88 moves backwardly, disengaging from the drive disk 87 and ceasing rotation thereof.

The pinion 90 of the rotational member 88 is engaged with a pinion 94, and a pinion 95, connected to the pinion 94, is also engaged with a pinion 96 of the shaft 86 of the pump 85. Accordingly, in the case whereby rotational member 88 is rotated, the pump 85 is actuated to transfer the fluid to the regulator 40. Even if the rotational member 88 is moved back and forth, the pinion 94 is always engaged with the pinion 90 of the rotational member 88.

The second energy converter 23 periodically operates to actuate the generator 83 when the motor car 10 is moving by inertial forces. Power output of the second energy converter 23 is strong, but the working duration is relatively short. However, the regulator 40 receives and retains high pressure therein, so that all the energy transmitted to the regulator 40 can be utilized. Namely, the power from the first energy converters 17, 17', 17", 17''' and the second energy converter 23 is combined at the regulator 40 and is almost completely utilized for actuating the power cylinders 42, 43.

The invention has been described with reference to a specific embodiment, but it is to be noted that the description is illustrative and the invention is limited only by the appended claims.

What is claimed is:

1. An electric power generating system adapted for use in a vehicle including at least one electric generator and one battery, comprising at least one energy converter for receiving superfluous movement of the vehicle and producing pressure fluid flow from such movement, and power transmitting means for receiving and changing the fluid flow into rotational power, and transmitting rotational power to the electric generator when stored rotational power reaches a predetermined level, said power transmitting means comprising two power cylinders, each power cylinder having a power piston therein and a power piston rod extending outwardly from the power cylinder, said power piston being actuated by the pressure fluid flow transferred from the energy converter, coupling means engaged with said power piston rod of the power cylinder for changing reciprocal movement of the power piston into rotational movement, a speed converter disposed between said coupling means and said electric generator, and a two way valve for selectively transmitting said pressure fluid flow into one of said two power cylinders to alternately operate said power cylinders for continuously rotating said speed converter, whereby the generator is operated by superfluous movement of the vehicle to generate electricity.

2. An electric power generating system according to claim 1, in which each of said power cylinders further includes a piston spring inside said power cylinder to urge the power piston to a retracted position, an outlet valve connected to the cylinder, and a switch for actuating the two-way valve and the outlet valve so that when one of the power pistons extends to a maximum position, the switch operates to change the two-way valve to allow the pressure fluid flow to enter into the other cylinder and close the outlet valve of the other cylinder, and additionally opening the outlet valve of the extended power cylinder to allow the fluid to exit therethrough by pressure of the power piston due to the piston spring.

3. An electric power generating system according to claim 2, in which said power transmitting means further comprises a pressure regulator to maintain a constant flow of fluid from the energy converter to the cylinders, and a fluid reservoir to receive fluid from the power cylinders and supply the fluid to the energy converter.

4. An electric power generating system according to claim 2, in which said coupling means comprises a shaft, two single-direction gears connected to the shaft to rotate the shaft in one direction, said gears being engaged with the power piston rods to transfer only expansion movement of each power piston rod to the shaft, and a coupling spring situated between the shaft and an end of the speed converter, whereby rotational power applied to said shaft is retained in the coupling spring and the speed converter rotates to operate the electric generator when rotational power reaches a predetermined level.

5. An electric power generating system according to claim 1, in which said energy converter comprises at least one first energy converter including at least one fluid pump having a handle, said handle being connected to a wheel shaft of the vehicle to receive vertical movement of the wheel shaft due to driving operation of the vehicle so that the fluid pump is operated to transfer fluid to the power transmitting means.

6. An electric power generating system according to claim 5, in which said first energy converter is provided with two fluid pumps, said two fluid pumps being so arranged that when the wheel shaft moves, one of the pumps is in an inspiration cycle and the other pump is in an expiration cycle, so that fluid is continuously transmitted to said power transmitting means.

7. An electric power generating system according to claim 6, in which said fluid pump further comprises a pump cylinder, a pump piston located in the pump cylinder and engaged with the handle for upward and downward movement due to vertical movement of the wheel shaft, and two one-way valves for inspiration and expiration of fluid into and out of the cylinder.

8. An electric power generating system including a plurality of said first energy converters according to claim 7, in which said first energy converters are provided at least at one of the front and rear suspensions of the vehicle.

9. An electric power generating system according to claim 5, further comprising a second energy converter adapted to receive rotational power of a drive shaft of the vehicle due to inertial movement of the vehicle.

10. An electric power generating system according to claim 1, in which said energy converter comprises a second energy converter adapted to receive rotational power of a drive shaft due to inertial movement of the vehicle.

11. An electric power generating system according to claims 9 or 10, in which said second energy converter comprises clutch means having a drive disk affixed to the drive shaft and a rotational member slidably situated along a longitudinal direction of the drive shaft, operation means for sliding the rotational member toward the drive disk to frictionally connect said rotational member with said drive disk to thereby rotate the rotational member around the drive shaft, and pumping means connected to said rotational member for flowing fluid to said power transmitting means, said operation means being actuated only when said drive shaft is not driven by power means of the vehicle, so that the rotational member of the clutch means is driven by rotation of the drive shaft due to inertial movement of the vehicle.

12. An electric power generating system according to claim 11, in which said rotational member of said clutch means includes a front frictional portion to frictionally engage said drive disk, and a clutch pinion engaged with said pumping means.

13. An electric power generating system according to claim 12, further comprising immovable intermediate gear means disposed between the pumping means and the clutch pinion of the clutch means, said clutch pinion continuously engaged with the intermediate gear means.

14. An electric power generating system according to claim 11, in which said operation means comprises an operating piston connected to said rotational member, an operation pump for moving the operating piston back and forth, and a switch for actuating said operation pump, said switch being associated with an accelerator of the vehicle so that when the accelerator is off, the switch operates to actuate the operation pump to thereby frictionally connect the rotational member with the drive disk.

* * * * *